May 19, 1970     R. F. GRIECO     3,512,309
FIXTURE FOR SUPPORTING A TOOL SUBJECT TO GRINDING
Filed July 1, 1966     3 Sheets-Sheet 1

INVENTOR
ROCCO F. GRIECO

BY *Laurence D. Lerner*
ATTORNEY

May 19, 1970 R. F. GRIECO 3,512,309
FIXTURE FOR SUPPORTING A TOOL SUBJECT TO GRINDING
Filed July 1, 1966 3 Sheets-Sheet 2
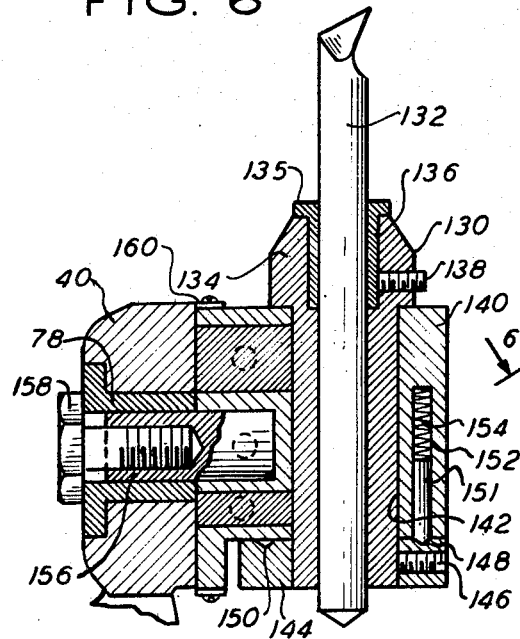
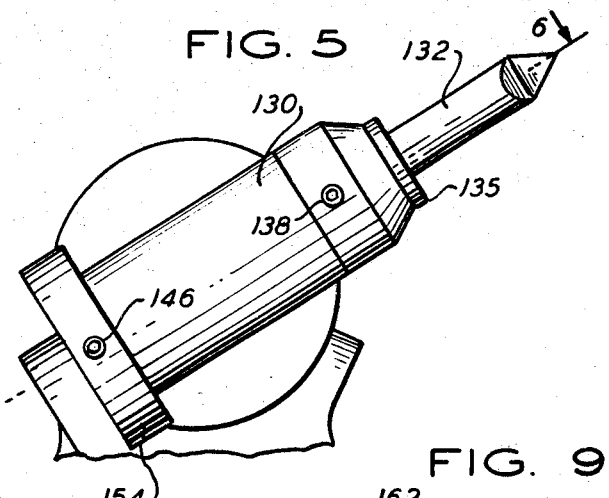
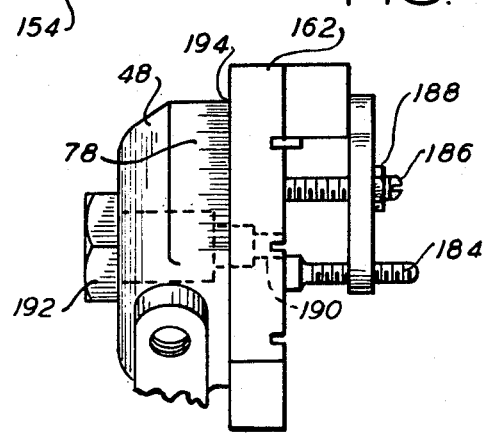
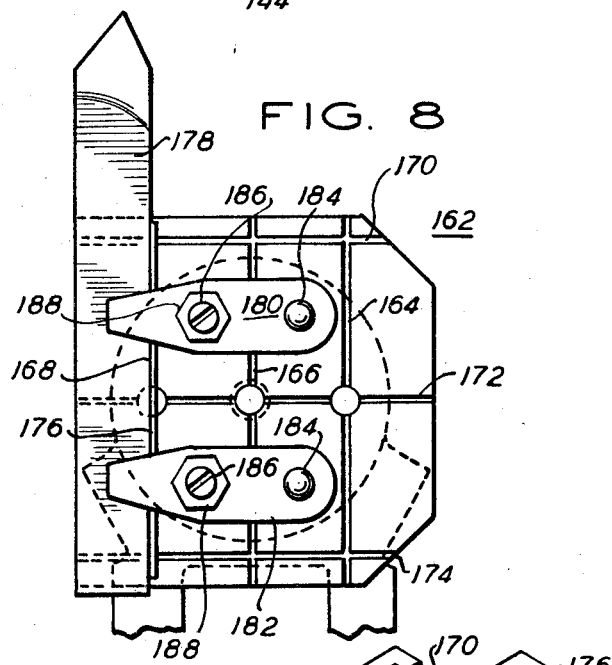
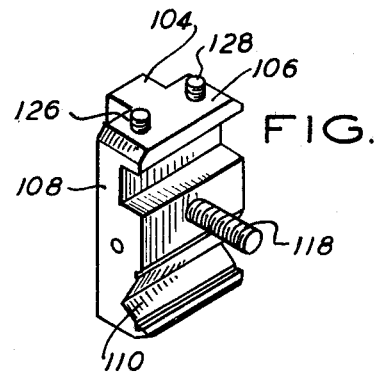
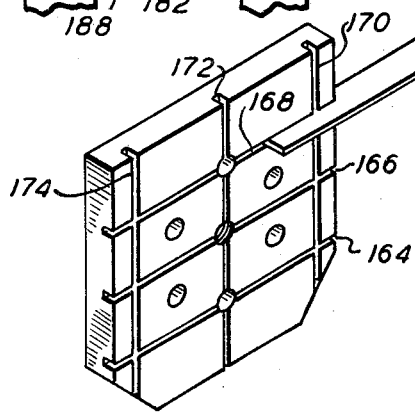
INVENTOR
ROCCO F. GRIECO
BY
ATTORNEY May 19, 1970  R. F. GRIECO  3,512,309
FIXTURE FOR SUPPORTING A TOOL SUBJECT TO GRINDING
Filed July 1, 1966  3 Sheets-Sheet 3

INVENTOR
ROCCO F. GRIECO
Lawrence D. Lerner
BY  ATTORNEY

United States Patent Office 3,512,309
Patented May 19, 1970

3,512,309
FIXTURE FOR SUPPORTING A TOOL SUBJECT
TO GRINDING
Rocco F. Grieco, 14 Wittkop Place,
Millburn, N.J. 07041
Filed July 1, 1966, Ser. No. 562,197
Int. Cl. B24b 41/06
U.S. Cl. 51—218                                                5 Claims

ABSTRACT OF THE DISCLOSURE

A fixture for holding a tool for grinding wherein the holder is mounted for universal adjustment about several perpendicular axis and provided with alternate tool holders for specific tools.

In general, this invention relates to a new and improved fixture for supporting a tool subject to grinding and more particularly to supporting a tool such as a thread cutting tool for application thereof to a grinding wheel to shape or sharpen the cutting edge thereof and to provide the same with accurate cutting and clearance or relief angles.

Thus, the present invention contemplates the provision of a multi-purpose tool holding fixture having a rotatably mounted base for accurately positioning a tool about an axis perpendicular to the horizontal base. The base supports a carrier block which can be tilted about an axis parallel to the front edge of the base. The angle of tilt to the carrier block determines the degree of clearance or relief angles which the shaped cutting edge of a tool supported by the carrier block is provided during a grinding operation. Further, means are provided for supporting the tool for rotation on said carrier block about an axis running perpendicular to the front face of the carrier block. Accordingly, the tool supported in the tool holding means can be inclined at selected angles so as to grind opposite faces of the cutting edge of the tool steel so as to achieve an accurate thread cutting tool.

The tool holding means can be a specially designed block with supports thereon for assuring right angle support of the tool steel during the grinding operation or, in the alternative, with respect to rod type tool steel, the rod type tool steel can be positioned to a special tool holder which indexes the steel for cutting at more than one angular position without requiring any changes in the settings of the fixture.

Additionally, the invention contemplates the provision of a less expensive fixture for holding tool steel which eliminates the feature of allowing rotation about an axis perpendicular to the base, but does incorporate the features of increasing the ease with which the tiltable carrier block is maintained at a given angular position.

Further, the present invention contemplates the provision of precision extensions which enable the user of the fixture for holding tool steel to accurately determine the angular position of the carrier block with respect to the base by merely utilizing a precision micrometer or the like.

Accordingly, it is the general object of this invention to provide a new and improved fixture for supporting tool steel for grinding to produce a better thread cutter or other cutting tool.

A further object of this invention is the provision of a new and better fixture for holding tool steel for grinding purposes which fixture can be accurately positioned about three individually mutually perpendicular axes to achieve complete control of the position of the tool relative to the grinding wheel.

A still further object of this invention is the provision of a new and better grinding fixture which enables one to grind all types of thread cutters with maximum speed and accuracy at minimum cost and which will accurately position flat tool stock in planes perpendicular to one another.

Another object of this invention is the provision of a new and better fixture for holding round stock tool steel for grinding which enables the tool steel to be indexed to different sides during grinding of the stock while being accurately maintained in a predetermined angular position to produce a better cutting tool.

Still another object of this invention is the provision of a new and better fixture for angularly positioning tool steel held in a tool holder, which angular position can be accurately measured in a simple and easy manner.

Other objects will appear hereinafter.

The present invention may be embodied in other specific forms without departing from the spirit or essential attributes thereof and, accordingly, reference should be made to the appended claims rather than to the foregoing specification as indicating the scope of the invention.

FIG. 5 is a side elevational view of the fixture of FIG. 1 shown with the round stock tool holder built in accordance with the principles of the present invention.

FIG. 6 is a cross sectional view of the tool holder and fixture of FIG. 5 taken along lines 6—6.

FIG. 7 is a prospective view of the tool holder utilized in FIGS. 1–4.

FIG. 8 is a front elevational view of another type of tool holder built in accordance with the principles of the present invention and mounted on the fixture af FIGS. 1–4.

FIG. 9 is a side elevational view of the tool holder of FIG. 8.

FIG. 10 is a prospective view of the tool holder shown in FIGS. 8 and 9.

Figure 1:
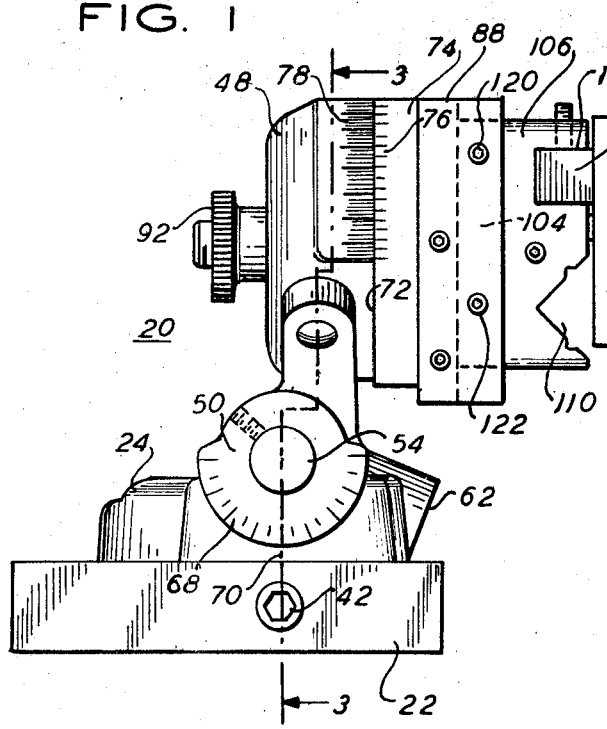
FIG. 1 is a front elevational view of a fixture built in accordance with the principles of the present invention.

In FIG. 1, there is shown a fixture built in accordance with the principles of the present invention and generally designated by the numeral 20.

The fixture 20 has a base 22 on which is positioned a pedestal 24. The pedestal 24 can be rotated about an axis perpendicular to the base 22 to achieve one form of angular control for the fixture 20. As stated, the pedestal 24 rests on the base 22 and has a screw thread receiving recess 26 centrally located and perpendicularly extending from the bottom surface thereof. The screw thread receiving recess 26 receives the screw threads 28 on the end of an enlarged hub 30 which fits within a cylindrical opening 32 in the base 22. The hub 30 has an annular channel 34 in the outer surface thereof aligned with set screw holes 36 and 38 which extend from the side walls of the base 22 into the cylindrical opening 32 to align with the groove 34. In the set screw holes 36 and 38 are placed set screws 40 and 42 respectively each pushing a bronze pad 44 and 46 respectively, which bronze pads will fit within the groove 34 but which will not damage the hub 30. Thus the hub 30 acts as a downwardly extending bearing which can be tightened by tightening the set screws 40 and 42. The pedestal 24 can be rotated into a desired angular position and then maintained in that position by merely tightening the said screws 40 and 42. Indicia (not shown) are provided on the base 22 and pedestal 24 to determine the angular position of pedestal 24.

On the pedestal 24 there is positioned a tiltably moveable carrier block 48. The carrier block 48 is adapted to be disposed at a selected angle of inclination from the perpendicular whereby to predetermine the degree of clearance or relief angles for which side faces of the cutting end of a tool are to be provided. The carrier block 48 is adjustably connected with the pedestal 24 so as to be tiltable at a selected degree of inclination. To permit this, the lower end of the carrier block is provided with hinging knuckle elements 50 and 52 which are fixedly connected to the ends of a hinge pin 54, the latter being rotatably supported by a bearing member 56 integral with the pedestal 24, so as to be straddled by said hinging knuckle elements 50 and 52. Said hinging knuckle elements 50 and 52 turn in complementary seats 58 and 60 formed in the pedestal 24. Threaded through a boss 62, which forms a unitary part of the pedestal 24, is a set screw 64 which, when turned, engages a bronze pad 66 and binds the hinge pin 54 against rotation, whereby to releasably fix the carrier block 48 in a selected tilted position. To select an indicated desired degree of carrier block tilt, the marginal outer end surface of hinge knuckle 50 is provided with scale graduations 68 which are cooperative with a perpendicular mark 70 with which the coincident side surface of the base 24 is provided.

Thus, the carrier block 48 is adaptable to be rotated about an axis perpendicular to the base 22 and about an axis parallel to the base 22.

The carrier block 48 has a flat front face 72 against which is mounted a cylindrical positioning block 74. The positioning block 74 has graduations 76 thereon which, in cooperation with the graduations 78 on the carrier block 48, enable one to determine the relative angular position on the positioning block 74 with respect to the carrier block 78. The positioning block 74 has a cylindrical hub 76 which fits through a passage way 78 in the carrier block 48. The hub 76 is held in place within the passageway 78 by set screw 80 which forces a bronze pad 84 against the hub 76. The passageway 78 is formed in a cylindrical flanged insert 86 passing through the center of the carrier block 48, which insert 86 is fixedly secured by set screw 82. Accordingly, the angular position on the positioning block 74 can be varied by merely releasing set screw 80 and allowing the positioning block 74 to be rotated to a desired angular position.

A channel member 88 is secured to the positioning block 74 by reason of integral pin 90 which passes through the hub 76 and is fixed in place by a threaded nut 92. Accordingly, the channel 88 can be rotated with respect to the positioning block 74 in accordance with the desires of the user. For this purpose, the back surface of the channel 88 is provided with a spring biased pin 94 adapted to fit within suitable indexing holes 96, 98, 100, and 102; 98', 100', and 102', formed on the surface of the positioning block 74.

Figure 2:
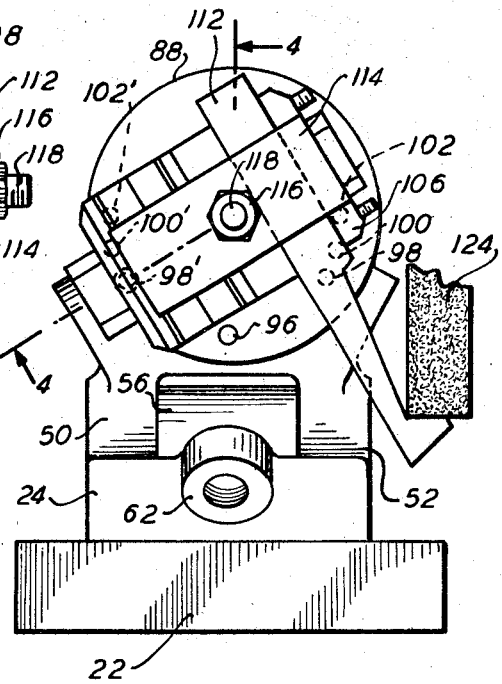
FIG. 2 is a side elevational view of the fixture of FIG. 1 with the tool holder rotated for grinding the tool steel to form a thread cutter for grinding internal U.S.S. threads.
Figure 3:
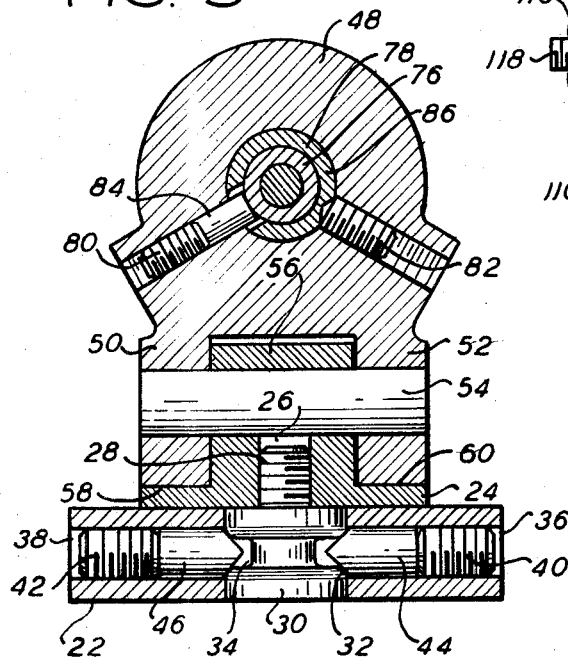
FIG. 3 is a cross sectional view of the fixture of FIG. 1 taken along lines 3—3.
Figure 4:
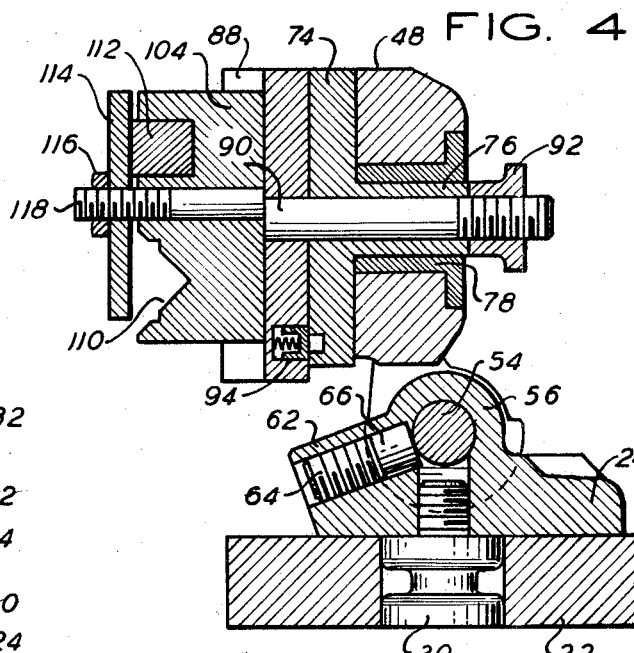
FIG. 4 is a cross sectional view of the fixture of FIG. 2 taken along lines 4—4.
Figure 11:
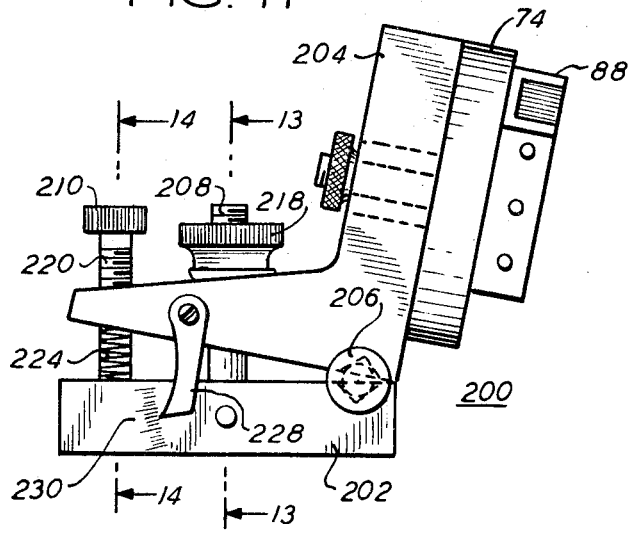
FIG. 11 is a front elevational view of another type of fixture built in accordance with the principles of the present invention.
Figure 12:
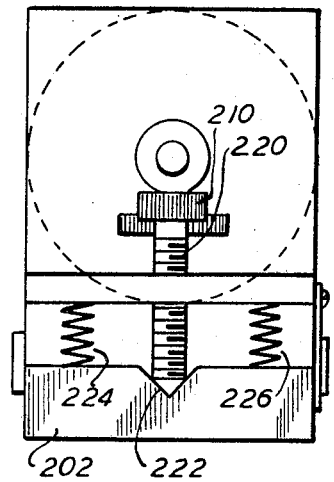
FIG. 12 is a left side view of the fixture of FIG. 11.

With the positioning block 74 set in the zero position so that hole 96 is as shown in FIG. 2, at its lowermost position, centrally located between the side edges of the positioning block 74, the channel 88 can be indexed in the manner shown in my U.S. Pat. 2,735,245. Additionally, if desired, more complete control of the angular position of the channel 88 with respect to the carrier block 48 can be achieved by merely rotating carrier block 74. This can be achieved, as previously stated, by releasing set screw 80 and setting the scale 74 and 78 to a desired angular position.

The channel 88 is adapted to receive the tongue 104 of a tool holder 106. The tool holder 106 has a square channel 108 therein to receive square tool steel and a triangular channel 110 to receive rod type tool steel. A piece of tool steel 112 is shown held in place within the channel 108 by plate 114 forced into engagement with the tool steel 112 by a nut 116 threaded on a bolt 118 secured to the tool holder 106. The tongue 104 is secured within the channel 88 by suitable set screws 120 and 122.

For purposes of best showing the present invention, FIG. 1 shows the channel member 88 with its spring biased pin 94 in hole 96 so as to place the tool steel 112 in a horizontal position when it is desired to grind the tool steel for square thread cutting. In FIG. 2, for purposes of clarity, the channel 88 has been rotated wherein the spring plunger 94 is shown in the hole 98' to arrange the tool steel 112 for grinding internal U.S.S. thread cutters with the grinding wheel 124.

The saddle mount type tool holder 106 is best shown in FIG. 7 wherein it can be seen that in addition to the plate 114, the tool steel can be held in place within the square channel 108 by set screws 126 and 128. This is especially useful when the tool steel 112 is not as wide as the channel 108.

In FIGS. 5 and 6, there is shown another form of the present invention. That is, in FIG. 5 there is shown a rod type tool steel holder 130 adapted to support rod tool steel 132 for grinding purposes. The holder 130 includes a cylindrical member 134 having a passageway 136 therethrough. A tubular insert 135 is placed in passageway 136 and the tool steel 132 is placed in the insert 135. The tool steel 132 is held in place within the passageway 136 by set screw 138 passing through the wall of a tubular insert 135. Different inserts 135 can be used for different sizes of tool steel. The holder 130 also includes a main body 140 having a cylindrical passageway 142 therethrough which receives the cylindrical portion 134. The back of the cylindrical portion 134 passes outside of the main body 140 and has a suitable knob 144 connected thereto by a set screw 146 for rotating cylindrical member 134. The handle 144 has a plurality of indexing indentations 148, 150 at four equally spaced points thereabout. The indentation 148, 150 are aligned, when rotated, to receive a pin 151 supported within a suitable bore 152 and biased by a spring 154 therein.

The main body 140 has an integral flange member 156 which fits within the opening 78 through the carrier block 48 and is held in place by suitable bolt 158 screw threaded into the extension 156. The main body also has a marker 160 which is alignable with the indicia 78 on the carrier block 48 so that the angular position of the holder 130 can be easily determined.

In use, the angular position of the tool steel 132 is set by loosening bolt 158 and aligning the marker 160 with the indicia 78 on the carrier block 48. Then, the bolt 158 is tightened in place. Thereafter, if, for example, four sides of the tool steel 132 are to be ground in the same way, or if two sides are to be so ground it is only necessary to rotate the handle 154 to a new index position as determined by the indentation 148, 150 and the spring biased plunger 151. More than four equally spaced indentation 148, 150 can be provided as desired.

In FIGS. 8 and 9, there is shown a tool holder adapted to be used with the fixture of the present invention useful for flat tool steel stock of varying dimensions which will enable accurate grinding to be achieved in a simple and easy manner. That is, in FIG. 8 there is shown a tool holder 162 having a plurality of parallel vertical grooves 164, 166, 168 and a plurality of horizontal grooves 170, 172, and 174. A flat strip 176 fits within groove 168 and acts as a supporting surface for a piece of flat tool steel stock 178. The tool steel stock 178 is held clamped in place by clamping members 180 and 182 which are placed through threaded bolts 184 and 186. Bolt 186 has a nut 188 placed thereover to clamp the members 180 and 182 in place against the tool steel 178. The tool holder 162 has a central recess 190 which receives a suitable bolt 192 passing through the carrier block 48 to hold the tool holder 162 flat against the face of the carrier block 48. Indicia 194 (not shown) is provided on the back face of the tool holder 162 to align it with the markings 78 on the surface of the carrier block 48 so as to angularly position the tool holder 162. Since the strips 176 insure that the tool steel is maintained at a given angular position, or, if the strip 176 is placed in one of the slots 170, 172 or 174 at a right angle thereto, it is a simple matter to accurately position the tool steel 178 regardless of its width or thickness.

Figure 13:
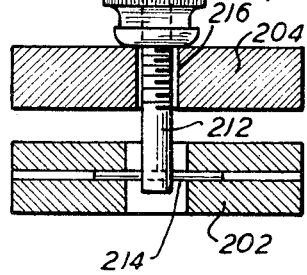
FIG. 13 is a cross sectional view of the fixture of FIG. 11 taken along lines 13—13.
Figure 14:
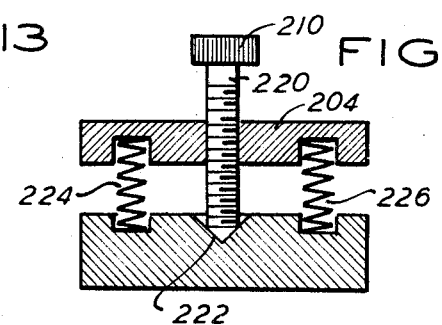
FIG. 14 is a cross sectional view of the fixture of FIG. 11 taken along lines 14—14.

In FIGS. 11–14 there is shown another type of fixture 200 built in accordance with the principles of the present invention. The fixture shown in FIGS. 11–14 is less expensive to manufacture, but in addition provides somewhat less advantages than the fixture shown in FIGS. 1–10. That is, the fixture 200 comprises a base 202 and a carrier block 204. The carrier block 204 is adapted to support any of the tool holders discussed previously, but it is shown with the positioning block 74 and channel member 88 of FIG. 1. The carrier block 204 is pivotally mounted on a suitable open pivotal connection 206 adjacent and parallel to the front edge of the base 202 and the carrier block 204. Thus, the carrier block 204 is adapted to be rotated about the pivot 206 and held in place by an upper limit screw threaded member 208 and a lower limit screw threaded member 210. The upper limit screw threaded member 208 comprises, as shown in FIG. 13, a bolt 212 fixed to the base 202 by a screw thread receiving member 214. The carrier block 204 is slidable on the bolt 212 and the opening 216 through which the bolt 212 passes is larger than the bolt 212. However, the carrier block 204 cannot move upwardly any further than is allowed by the nut 218 threaded on the upper end of the bolt 212. To prevent the carrier block 204 from going below a lower limit, a second bolt 220 is provided, screw threaded into the carrier block 204 and adapt to have its end received within a notch 222 formed on the upper surface of the base 200. Two springs 224 and 226 on opposite sides of the bolt 220 spring bias the carrier block 204 upwardly. Accordingly, the spring biasing springs 224 and 226 force the carrier block 204 upwardly until limited by the nut 218. The nut 218, if screw threaded downwardly, causes the carrier block 204 to move downwardly until limited by the bolt 220 touching the notch 222 in the base 202. The given angular position is determined by a suitable pointer 228 which reads directly on a scale 230 formed on the side surface of the base 202 to tell the operator exactly the angle of the carrier block 204 with respect to the base 202. Thus, the fixture 200 will accurately, and directly, position the carrier block 204 about an axis parallel to the base 202 without the necessity for accurate machining of the knuckle joints 50 and 52 as was necessary with the fixture of FIG. 1.

Figure 15:
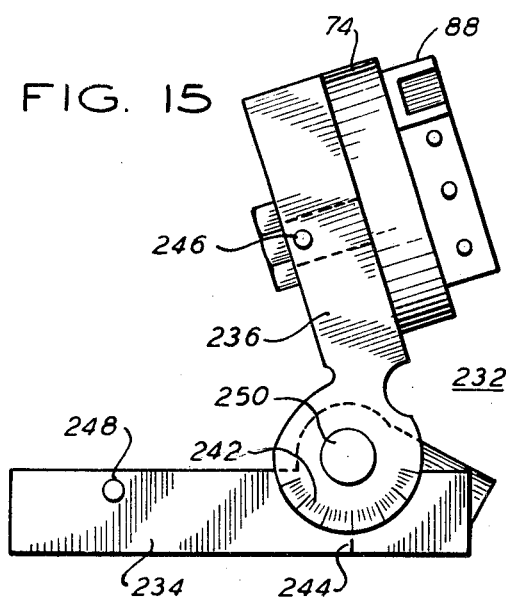
FIG. 15 is a front elevational view of a third embodiment of the present invention.
Figure 16:
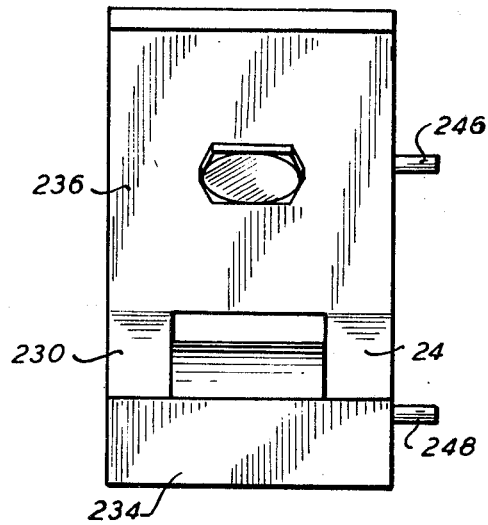
FIG. 16 is a left side elevational view of the fixture of FIG. 15.

In FIGS. 15 and 16, there is shown a fixture 232 built in accordance with the principles of the present invention and similar to the fixture shown in my U.S. Pat. 2,735,245, the disclosure of which is incorporated by reference in this specification. The fixture 232 has a base 234, and a carrier block 236 which is joined at the base 234 by knuckle members 238 and 240. However, although a scale 242 is provided on the knuckle member 230 with a marker 244 on the base 234, it is often difficult to obtain accurate measurements as to the angle of the carrier block 236 with respect to the base 234. In order to accurately determine the angle of the carrier block 236 with respect to the base 234, I have provided two measuring pins 246 and 248. Measuring pins 246 and 248 are placed equidistant from the pivot 250 of the fixture 232 on the carrier block 236 and the base 234 respectively. Thus, if one wished to measure the angle between the carrier block 236 and the base 234 accurately, it is only necessary to place a micrometer between the pins 246 and 248, take a linear measurement, and then convey the linear measurement on a suitable scale into the angle between the carrier block 236 and the base 234. The scale can be easily set up by simple trigonometric means. Accordingly, extremely accurate measurments of the angle between the carrier block 236 and the base 234 can be achieved in a simple and easy manner.

The present invention may be embodied in other specific forms without departing from the spirit or essential attributes thereof and, accordingly, reference should be made to the appended claims rather than to the foregoing specification as indicating the scope of the invention.

I claim as my invention:

1. A fixture to support a cutting tool for grinding comprising a base, a pedestal mounted on said base for angular positioning about an axis perpendicular to said base, a carrier block mounted on said pedestal for tiltable positioning about an axis parallel to said base, said carrier block having a flat tool holder receiving face, and a tool holder for holding a cutting tool for grinding, said tool holder being mounted for engagement on the flat face of said carrier block and for rotational positioning about an axis perpendicular to said flat face, said pedestal including indicia thereon for determining the angular position of said pedestal with respect to said base about the axis perpendicular to said base, said pedestal having a downwardly extending hub, said hub being cylindrical in shape and adapted to fit within a cylindrical opening in said base, said hub having an annular groove therein, set screw means for fixedly positioning said pedestal in said base in a predetermined angular position relative to said base about the axis of said hub, said hub axis forming the said axis perpendicular to said base, said set screw including diametrically opposed set screws and bronze pads placed within suitable aligned holes in said base, and said bronze pads interposed between a set screw and said hub annular groove in said base to prevent wear on said hub and to maintain said hub in a fixed position.

2. A fixture to support a cutting tool for grinding comprising a base, a pedestal mounted on said base for angular positioning about an axis perpendicular to said base, a carrier block mounted on said pedestal for tiltable positioning about an axis parallel to said base, said carrier block having a flat tool holder receiving face, and a tool holder for holding a cutting tool for grinding, said tool holder being mounted for engagement on the flat face of said carrier block and for rotational positioning about an axis perpendicular to said flat face, said tool holder comprising a body a cylindrical opening therein, means for fixing a rod-like tool steel within said main body cylindrical opening, a tool holder block, said body being rotatably mounted within said block, said block having a flat face placed against said carrier block of said fixture, said body axis being parallel to said flat face, indexing means for indexing said main body about the said axis parallel to said flat face, and a hub extending from said flat face for mounting said block on said carrier block for rotational positioning with respect thereto.

3. The tool holder of claim 2 wherein said body is connected to a handle, said handle being operative to control rotation of said body with respect to said block, said indexing means being operative to equiangularly position said body with respect to said block about the axis of said body, said body cylindrical opening being formed by an insert mounted in said body and interchangeable to provide openings for different sizes of rod like tool steel.

4. A fixture to support a cutting tool for grinding comprising a base, a pedestal mounted on said base for angular positioning about an axis perpendicular to said base, a carrier block mounted on said pedestal for tiltable positioning about an axis parallel to said base, said carrier block having a flat tool holder receiving face, and a tool holder for holding a cutting tool for grinding, said tool holder being mounted for engagement on the flat face of said carrier block and for rotational positioning about an axis perpendicular to said flat face, said tool holder comprising a flat body, said flat body having a flat front face and a flat back face, said flat back face having indicia thereon for cooperation with indicia on the carrier block of said fixture to determine the angular position of a tool holder with respect to the carrier block, means cooperative with said flat body for rotationally positioning said flat body with respect to said carrier block, said indicia providing an accurate determination of the angular position of the flat body with respect to the tool holder about an axis perpendicular to the flat faces of the flat body, said front face of said flat body having at least one groove therein in a predetermined position relative to said indicia, and a flat strip having a thickness equal to the width of the groove, said flat strip being fitted with the groove and having a height greater than the depth of said groove so as to provide a support surface at right angles to the front face of the flat body for supporting a tool steel, and clamping means for clamping said tool steel in position against the flat strip.

5. The tool holder of claim 4, wherein a second groove is provided on said front face, said second groove being of the same depth and width as said first mentioned groove and extending perpendicular thereto, whereby said flat strip may be placed in said second groove to provide a second position perpendicularly disposed with respect to said first position and to support tool steel in juxtaposition thereto.

References Cited

UNITED STATES PATENTS

| | | | |
|---|---|---|---|
| 1,889,248 | 11/1932 | Kilmer | 51—220 |
| 2,351,246 | 6/1944 | Walling. | |
| 2,390,428 | 12/1945 | Disse | 269—71 |
| 2,432,058 | 12/1947 | Wilken. | |
| 2,448,309 | 8/1948 | Grieco | 51—220 |
| 2,452,089 | 10/1948 | Wilken. | |
| 2,480,618 | 8/1949 | Tresidder | 51—237 |
| 2,607,274 | 8/1952 | Denzler | 269—71 X |
| 2,680,973 | 6/1954 | Toth. | |
| 2,700,854 | 1/1955 | Detrow | 51—225 X |
| 2,735,245 | 2/1956 | Grieco | 51—220 |

HAROLD D. WHITEHEAD, Primary Examiner